United States Patent [19]

Will et al.

[11] Patent Number: 4,806,746

[45] Date of Patent: Feb. 21, 1989

[54] APPARATUS AND PROCESS FOR FOCUSSING OF AN OPTICAL DISPLAY SYSTEM

[76] Inventors: Erich Will, Sonnenweg 1, D-6330 Wetzlar 21/OT Nauborn; Harry Harms, Johanniter Weg 30, D-8700 Wurzburg 30; Johannes Lüllman, Waller Strasse 24, D-2800 Bremen 1; Edgar Illgen, Moislinger Allee 108, D-2400 Lübeck; Siegfried Boseck, Heideweg 40, D-2804 Lilienthal-Klostermoor; Georg Schmidbauer, Burgblick 18, D-6551 Gutenberg; Horst Kreitlow, Hollige 42, D-3030 Walsrode 23, all of Fed. Rep. of Germany

[21] Appl. No.: 39,214

[22] Filed: Apr. 17, 1987

[51] Int. Cl.⁴ .............................................. G01V 1/20

[52] U.S. Cl. .................................... 250/201; 250/204

[58] Field of Search ....................... 250/201, 204, 209; 356/1, 4; 354/406, 407, 408

[56] References Cited

U.S. PATENT DOCUMENTS 4,314,150 2/1982 Takayama et al. ................. 250/201

4,410,804 10/1985 Stauffer .................................. 356/4

*Primary Examiner*—David C. Nelms

*Attorney, Agent, or Firm*—Edmund M. Jaskiewicz

[57] ABSTRACT

Process and apparatus for focussing of an optical display system in which the total of the light intensities for all the adjacent picture elements is added up and in passing through the focus area the maximum is determined from the total for a specific focussing which is then defined as focus plane, and in the adding up of each total by a preselection of the supplied signals only those brightness differences of adjacent picture elements are taken into account which make positive contributions to the adding up. The adding up and preselection is carried out by a computing device operating on an electronic basis for computing the total $$S = \sum_{y=1}^{N} \sum_{x=2}^{M-1} k_{x,y} {*} H_{x,y}$$

with $H_{x,y} = 2\,I_{x,y} - I_{x-1,y} - I_{x+1,y}$ and $$k_{x,y} = \begin{cases} 0, & \text{if } H_{x,y} \leqq 0 \\ 1, & \text{if } H_{x,y} > 0 \end{cases}$$

in which x is the line position of a picture element, y the column position of the picture element, $I_{x,y}$ the intensity of the picture element, M the number of lines of the image and N the number of columns of the image.

5 Claims, 3 Drawing Sheets

APPARATUS AND PROCESS FOR FOCUSSING OF AN OPTICAL DISPLAY SYSTEM

The present invention relates to focussing of an optical display system, more particularly, to an apparatus and process in which the brightness differences of the picture elements of the object for each focussing position are added up and the focussing position is selected which corresponds to a maximum of the totals together with a computing device for adding up and preselecting only positive brightness differences.

In the processes of the prior art (DE-AS Nos. 28 28 831 and DE-AS 28 38 121) the total of the brightness differences between adjacent picture elements for all picture elements of the object is added up, independently of whether the brightness differences exhibit a positive or negative value. Since in such a known process, for statistical reasons, the total value becomes very small, practically zero, the total is added by the amounts of the brightness differences, i.e., negative total values are treated as if they were positive. Also, since a great number of data is to be evaluated in the known processes which requires considerable computing times of the evaluating algorithms, the automatic focussing, for example, of a microscope take too long in the practical application. If simpler mathematical processes are used for the analysis, these are in most cases not very accurate.

To accelerate the computing process, for the focussing of a camera lens, it is known to use only the picture elements of an image section for the analysis (DE -OS No. 32 45 675) and as part of a double image process to compare the brightness differences of selected picture elements from the double image section with one another. This process has the disadvantage that the focussing is performed with a small number of output signals, as a result of which the focussing result suffers adversely. This process is especially unsuited for images limited by diffractive or refractive indices (phase contrast process), as occur in microscopes.

Because now according to the invention the intensity differences between all picture elements and their adjacent picture elements are determined and input as output signal in the downstream computer, the focussing process is based on a large signal sequence. In a second step are those intensity differences statistically selected from this signal sequence in the computer, which show a positive value. The other differences showing a negative value are not taken into account. Consequently the number of summands to be added becomes smaller, as a result of which the computing time is shortened without the accuracy of the fucussing process suffering. This process can be used not only for focussing a microscope but can generally be used for fosussing of any optical apparatus.

Mathematically expressed, the total is:

$$S = \sum_{y=1}^{N} \sum_{x=2}^{M-1} (k_{x,y})(H_{x,y})$$

with $H_{x,y} = 2\,I_{x,y} - I_{x-1,y} - I_{x+1,y}$ and $$k_{x,y} = \begin{cases} 0, \text{ if } H_{x,y} \leqq 0 \\ 1, \text{ if } H_{x,y} > 0 \end{cases}$$

Here, the following mean $k_{x,y}$ the evaluating factor for pixel x,y y the column number of the actual pixel in the sensor plane x the line number of the actual pixel in the sensor plane, $I_{x,y}$ the brightness value of the pixel x,y, N the number of columns in the sensor plane, M the number of picture elements of a line.

$H_{x,y}$ the brightness differences between the pixel x,y and the two adjacent pixels $x-1$,y and $x+1$,y An optical system is considered as focussed if its response in regard to high spatial frequencies is optimized. The intensity gradients occurring in the image represent a selective criterion for the detection of high spatial frequencies.

Since $H_{x,y}$ is sign subjected, in the case of a great number of picture elements in the adding up by all $H_{x,y}$ for statistical reasons results would be produced varying only slightly around zero, from which no fosussing can be derived. But the negative contributions to the amount are suppressed by the factor $k_{x,y}$, as a result of which usable total values are achieved.

As a rule, the image evaluating is performed by digital image data, since an analog process is indeed faster but clearly less accurate. Above all, the temperature drift of the components which is difficult to compensate for, influence of aging and the high sensitivity to outside disturbances quickly raise out of proportion the expense in the case of analog evaluating electronics.

The human eye reproduces an object by the light intensities, received by the cones and rods of the retina, being compared with one another and their weighted differences being added up. If in the accommodation process to an object a maximum is produced for this value, then the eye sees the object sharply, and the accommodation process is terminated.

It is therefore the principal object of the present invention to provide a novel and improved process and apparatus for focussing of an optical display system utilizying a computing device operating on an electronic basis.

It is another object of the present invention to provide such a process and apparatus for adding up the positive values of the sensed brightness differences between adjacent picture elements and for preselecting only those brightness differences which contribute to the total of the brightness difference and these totals are used to determine the focussing position.

It is a further object of the present invention to accelerate the automatic focussing in a one-image process and to perform this function with increased accuracy and speed.

It is an additional object of the present invention to provide an apparatus for focussing of an optical display system utilizying a computing device which totals only those brightness differences which provide a positive contribution to the total.

According to one aspect of the present invention, an apparatus for focussing of an optical display system may comprise sensor means in an image plane of an object for sensing the brightness differences between one picture element of the object and adjacent picture elements. Connected to the sensor are means for adding up the positive values of the sensed brightness differences for adjacent picture elements. The adding means comprises a computing device operating on an electronic basis to determine the total $$S = \sum_{y=1}^{N} \sum_{x=2}^{M-1} (k_{x,y})(H_{x,y})$$

with $H_{x,y} = 2\,I_{x,y} - I_{x-1,y} - I_{x+1,y}$ and $$k_{x,y} = \begin{cases} 0, \text{ if } H_{x,y} \leqq 0 \\ 1, \text{ if } H_{x,y} > 0 \end{cases}$$

The total S is calculated for each focussing position and from these totals a focussing position is selected at which the total is a maximum.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
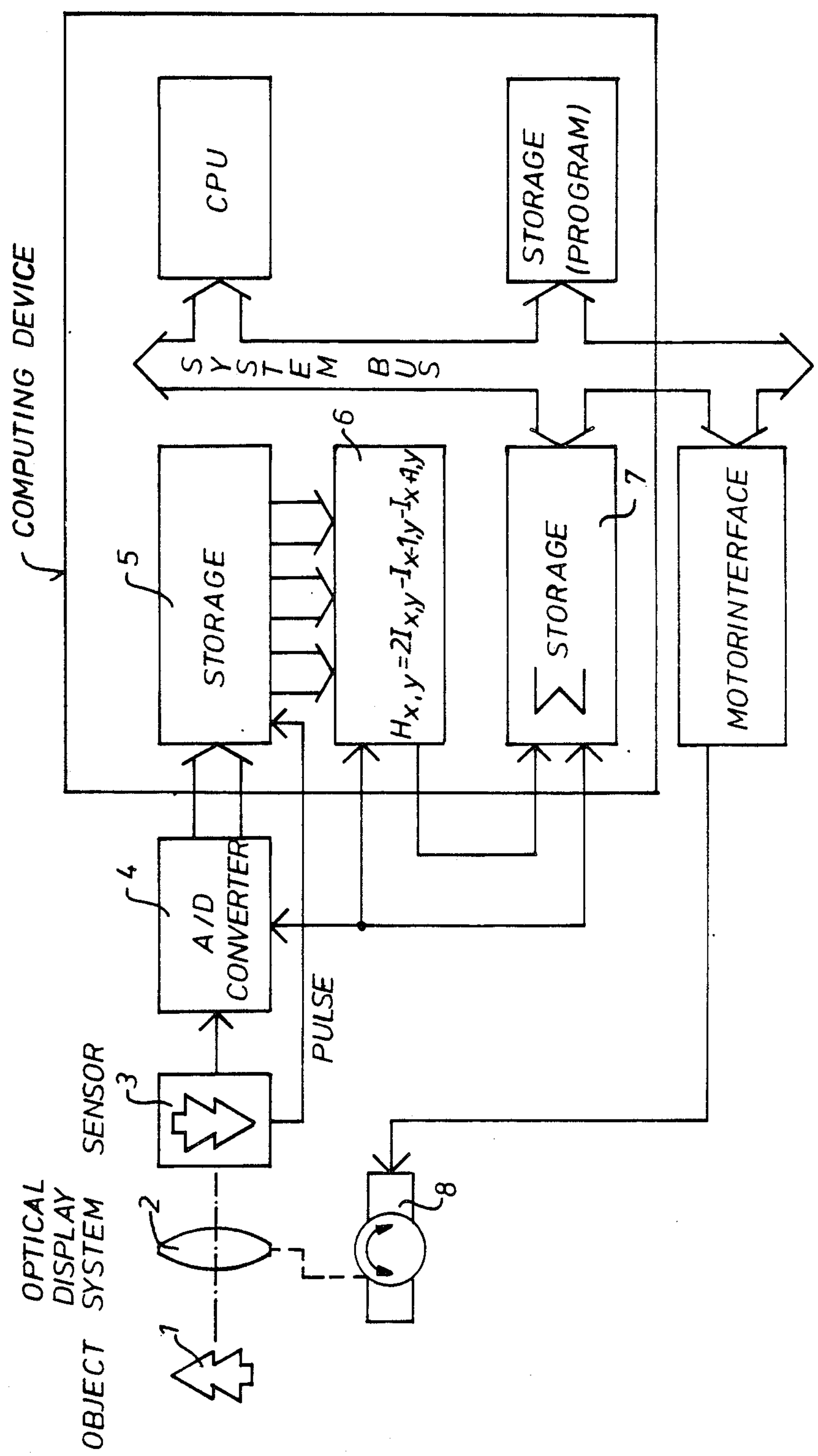
FIG. 1 is a diagramatic representation of the apparatus according to the present invention.

Object 1 is displayed by an optical display system 2 to a sensor 3. The image data are digitized in an analog-to-digital converter (AD converter) 4. The data is then accepted in a storage 5, and value $H_{x,y}$ is computed in unit 6. The result is added in a storage of totals 7, if $H_{x,y}$ is positive.

For automatic focussing, optical system 2 is moved in narrow steps in its distance from object 1, for example, with the help of a stepping motor 8. After each move, the above-mentioned total is added up and stored in storage 7. After passage through the focussing area, only those settings then have to be selected by which the pertinent total in storage 7 is a maximum. Totaling for each focus setting can be performed by hardware or software, and a microcomputer automatically moves the stepping motor back and forth until a focussing is produced.

In comparison with the processes belonging to the prior art according to DE-AS No. 28 28 831, which perform an adding up in the case of negative $H_{x,y}$ to obtain, also in the case of these values, a positive contribution to the amount, the present process has the advantage that in the case of good evaluating characteristics a gain in speed of about 10% is achieved by omitting the adding up.

A further gain in speed of up to 40% can be achieved, if ahead of the actual evaluating electronics is installed preprocessing electronics which passes on the input data to be evaluated to the evaluating electronics only if the data will make a contribution to the total.

Figure 2:
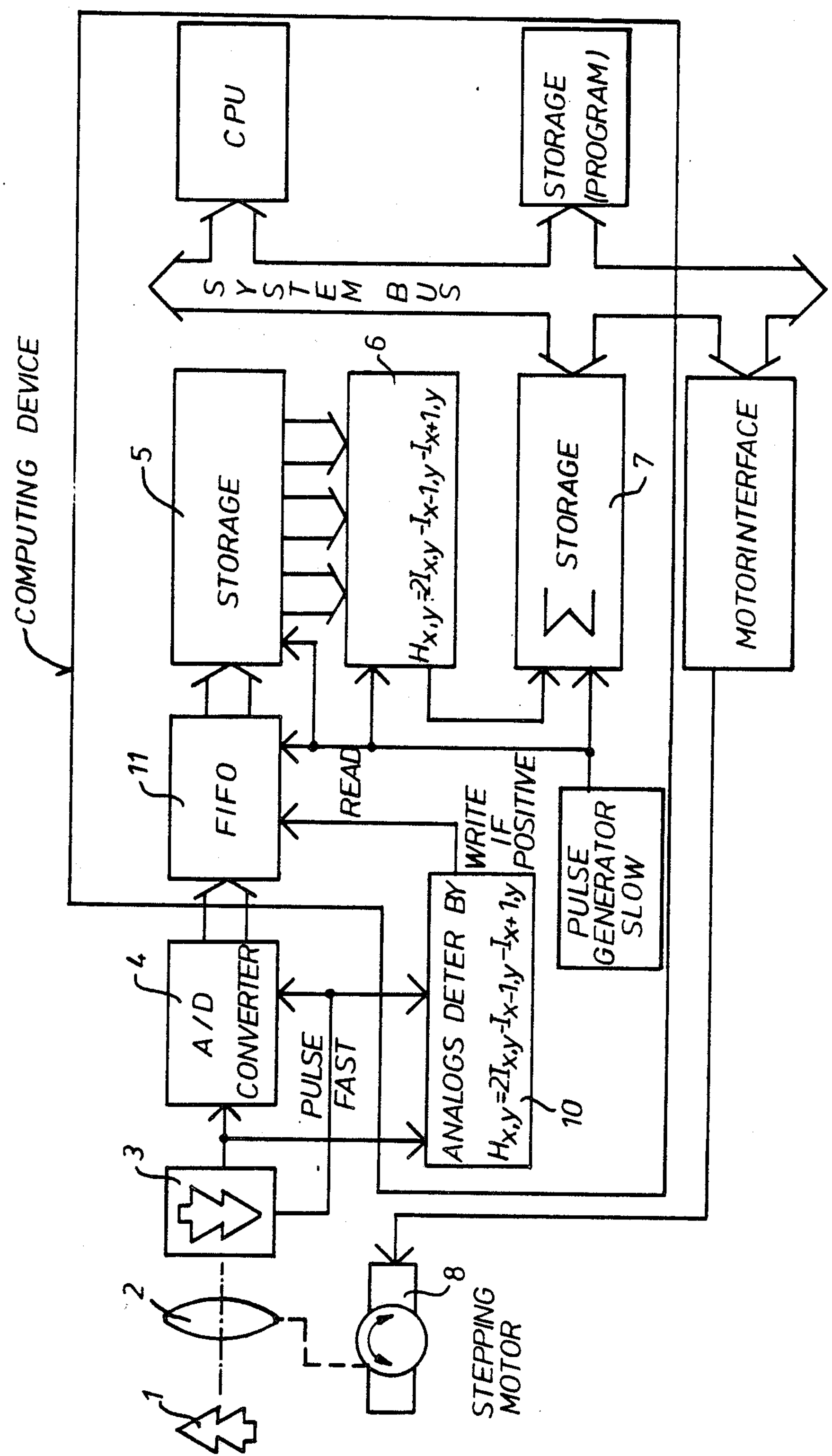
FIG. 2 is a diagramatic representation similar to FIG. 1 but showing a modification thereof.

FIG. 2 shows such an autofocussing system. The image data coming from sensor 3, on the one hand, is digitized in A-D converter 4 and, on the other hand, is checked in a unit 10 to see whether it makes a contribution to the total. If this is the case, it and the data of the adjacent elements are accepted in a fast temporary storage 11 (FIFO). From this storage the evaluated electronics reads the data. The rest of the autofocussing system corresponds to that of FIG. 1.

The advantage of the invention consists in the fact that the image data of the sensor can be read and processed almost twice as fast as the evaluated electronics can operate, since statistically only about half of the data in the FIFO must be accepted. In the case of similarly good evaluating characteristics for the detection of the optimal focus the gain in speed is considerable.

To achieve even faster setting results, the relevant area can be passed through twice, namely, once in broad steps for a rough focussing and a second time, to scan the relevant narrow area for fine setting. But in general a two-time passage is not necessary, if only the moving steps are small enough, which depends on the optical conditions, the focussing depth and the specimen.

Focussing can take place both by setting of the optics and by varying of the object width in the case of fixed image width. The latter represents the case in the use of a light optical microscope.

To determine the intensity differences between adjacent picture elements, a sensor can be placed in the image plane which determines the brightness differences of a picture element from its two adjacent picture elements in a line. This sensor is then to be moved in both coordinate directions of the image plane from picture element to picture element for totalling up.

The radius of the Airy disk, in which is the spatial distance from adjacent picture elements, by which intensity differences can still be determined, in this case must correspond or be greater than the pixel distance, which is the spatial distance of the picture elements that can be individually determined by a sensor.

However, such autofocussing is time consuming.

A faster result is achieved, if a sensor is provided which simultaneously determined the brightness differences of the picture elements of the line from their adjacent picture elements by the line length of the object image and if this line is moved step by step perpendicular to the line direction for the adding up.

A still faster result is achieved, if from the beginning a sensor is used which, distributed sheetlike, has a plurality of light-sensitive elements, which simultaneously determine the brightness differences of each picture element from its adjacent picture elements. In this case it is sufficient if this sensor also determines the brightness differences of the picture elements by the line.

For special measuring tasks, the sensor can be matched to the respective object. This can be achieved both by the form of the arrangement of the light-sensitive elements and by their distance from one another, which does not have to be equidistant (correlation mask). This is particularly useful for test objects.

Line sensors arranged cross-shaped are suitable, for example, for vertex refraction determinations.

With the use of a hardware for computing of the total it is even possible, without preprocessing, to evaluate up to 60 scanned images per second.

Figure 3:
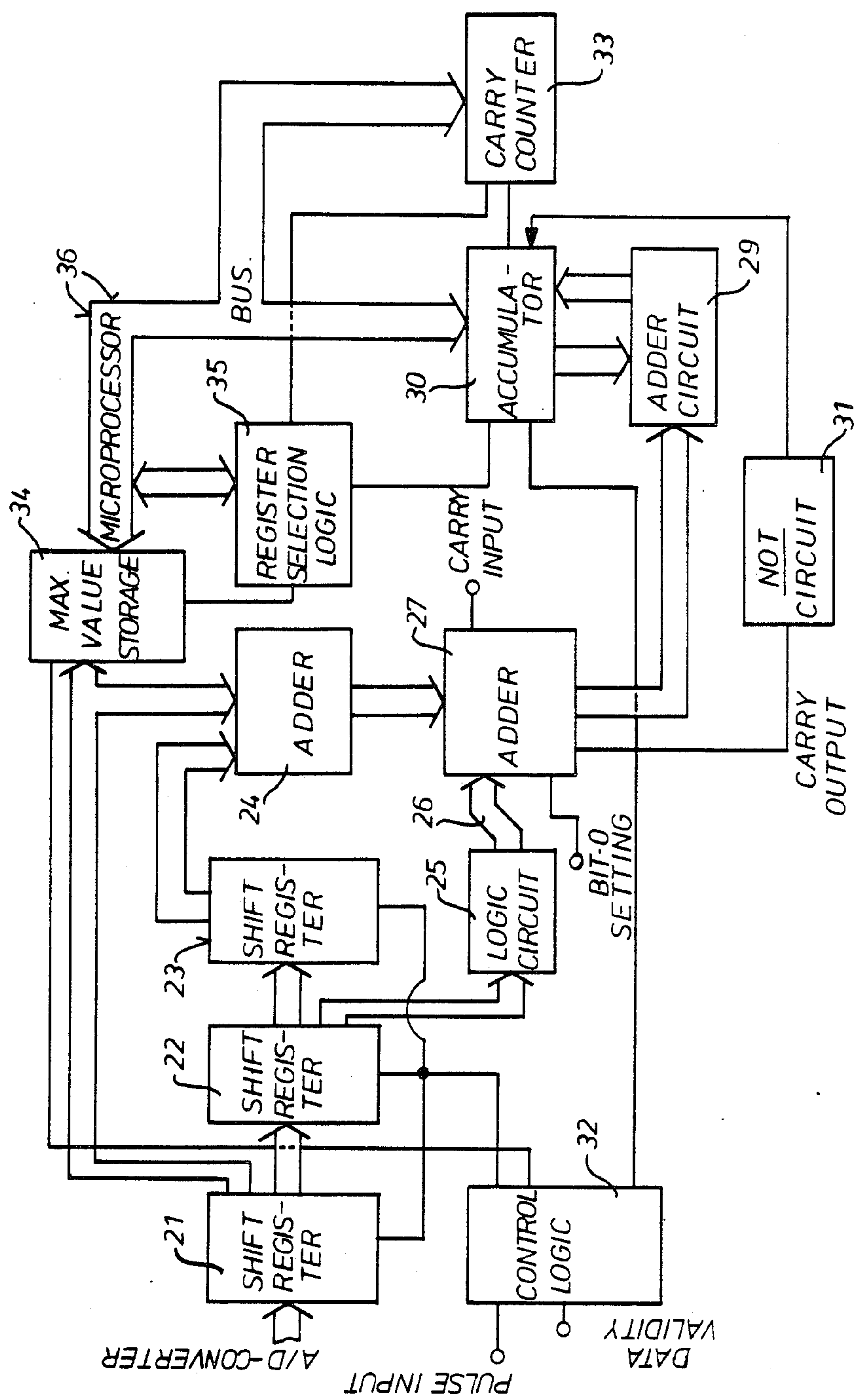
FIG. 3 is a diagramatic representation of the computing device utilized in the apparatus of FIG. 1.

According to FIG. 3, the digitized image data of three adjacent elements of a line are input either simultaneously or in succession in shift registers 21, 22,23, namely the value $I_{x+1,y}$, in register 21, the value $I_{x,y}$ in register 22 and the value $I_{x-1,y}$ in a register 23. All values input before $I_{x-1,y}$ are immaterial for the following computation and are lost during the inputting of the next value. A first adder 24, which adds the intensity of the outer picture elements $I_{x-1,y}$ and $I_{x+1,y}$ is connected below registers 21 and 23. The intensity value of center picture element $I_{x,y}$ is input in a first logic circuit 25 and here receives a negative sign. This value is shifted in a unit 26 by one bit position to the left, which corresponds to a multiplication by 2, and the freed bit is set at 1. The result of this operation corresponds to $-2\ I_{x,y}$ in the adding formula. A second adder 27, connected below, computes from the values coming from first adder 24 and unit 26 the the total $-2.\ I_{x,y}+I_{x-1,y}+I_{x+1,y-1}$. By setting of a carry input the missing 1 is added into the total. An adder unit 29, connected below second adder 27, inputs the values in an accumulator 30 if the total added in second adder 27 is positive.

For this purpose the receptivity of accumulator 30 is suitably controlled. The carry output of second adder 27 then gives a signal if the result of the addition in adder 27 is negative. In this case the result in adder unit 29 is not to be accepted in accumulator 30. Consequently the carry output, which is regarded as acceptance input of accumulator 30, is to be negated. To achieve this, below the carry output is connected a NOT circuit 31, which acts directly on accumulator 30. If the result in second adder 27 is positive, the result of adder unit 29 is accepted in accumulator 30. Since the carry output of second adder 27 is not set in this case, NOT circuit 31 in this case gives an acceptance signal to accumulator 30.

The image to be determined can be scanned, for example, with the help of a video camera. The scanning beam of this camera provides not only the intensity values of the individual picture elements determined in each case to shift registers 21, 22, 23 but at the same time controls a pulse generator in a control logic 32. The control logic acts on shift registers 21, 22, 23, so that with each new timed pulse, i.e. with the change of the scanning beam to the next picture element, the shift registers are receptive for new values.

The control logic at the same time checks whether the data impüt in shift registers 21–23 can be used, for it can happen especially on the picture edge that the value $I_{x-1,y}$ *l or the value* $Ix+1,y$ is no longer a picture element. Only if these values are genuine picture element values are the results of adder unit 29 accepted in accumulator 30. If an overflow occurs in this case, carry counter 33 is incremented, i.e., is increased by one unit. Accumulator 30, carry counter 33 and a maximum value storage 34 can then be read out and cleared by a microprocessor system. The selection of the addressed storage occurs by a register selection logic 35. Maximum value storage 34 is connected below register 21 to ascertain overloads.

If it is assumed that one and the same image is repeatedly scanned at different focussings, accumulator 30 and carry counter 33 store each time the value for a framing. Both can be read out and cleared by a register selection logic 35 of a microprocessor 36. Microprocessor 36 compares in each new framing to see whether with the values in accumulator 30 and in carry counter 33 a maximum value is involved. The microprocessor then gives a signal, for example, to a control device, to change the focussing of the image. The process is repeated until the image scanning clearly produces a maximum value. The pertinent framing is the desired focussing.

It will be understood that this invention is susceptible to modification in order to adapt it to different usages and conditions, and accordingly, it is desired to comprehend such modifications within this invention as may fall within the scope of the appended claims

What is claimed is:

1. An apparatus for focussing of an optical display system comprising a sensing means in a image plane of an object for sensing the brightness differences between one picture element of the object and two adjacent picture elements, means connected to said sensing means for adding up the positive values of the sensed brightness differences $H_{x,y}$, said adding means comprising a computing device operating on an electronic basis to determine the total $$S = \sum_{y=1}^{N} \sum_{x=2}^{M-1} (k_{x,y})(H_{x,y})$$

with $H_{x,y} = 2\,I_{x,y} - I_{x-1,y} - I_{x+1,y}$ and $$k_{x,y} = \begin{cases} 0, \text{ if } H_{x,y} \leqq 0 \\ 1, \text{ if } H_{x,y} > 0 \end{cases}$$

in which $k_{x,y}$ the evaluating factor for pixel x,y y the column number of the actual pixel in the sensor plane x the line number of the actual pixel in the sensor plane, $I_{x,y}$ the brightness value of the pixel x,y, N the number of columns in the sensor plane, M the number of picture elements of a line.

$H_{x,y}$ the brightness differences between the pixel x,y and the two adjacent pixels x−1,y and x+1,y such that said total S is calculated for each focussing position and from these totals a focussing position is selected at which the total S is a maximum.

2. An apparatus as claimed in claim 1 and further comprising means responsive to the total S of the added brightness differences for moving the optical system or varying the object distance to focus the object.

3. An apparatus as claimed in claim 1 wherein the resolution of the sensing means is less than or equal to the diameter of a said picture element.

4. An apparatus as claimed in claim 1 wherein said sensing means comprises individual light-sensitive elements disposed equidistant or non-equidistant from one another.

5. An apparatus as claimed in claim 1 wherein said sensing means comprises a correlation mask.

* * * * *